(12) United States Patent
Umeda et al.

(10) Patent No.: US 8,831,152 B2
(45) Date of Patent: Sep. 9, 2014

(54) DELAY DETECTOR CIRCUIT AND RECEIVER APPARATUS

(75) Inventors: Naoki Umeda, Osaka (JP); Mituru Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 121 days.

(21) Appl. No.: 13/576,809

(22) PCT Filed: Jul. 8, 2010

(86) PCT No.: PCT/JP2010/004451
§ 371 (c)(1),
(2), (4) Date: Aug. 2, 2012

(87) PCT Pub. No.: WO2011/096025
PCT Pub. Date: Aug. 11, 2011

(65) Prior Publication Data
US 2012/0294394 A1  Nov. 22, 2012

(30) Foreign Application Priority Data
Feb. 4, 2010 (JP) ................................ 2010-022671

(51) Int. Cl.
*H03D 1/00* (2006.01)
*H04L 27/227* (2006.01)
*H04L 7/04* (2006.01)

(52) U.S. Cl.
CPC .............. *H04L 27/227* (2013.01); *H04L 7/042* (2013.01)
USPC ....................................................... 375/343

(58) Field of Classification Search
CPC ........ H04L 27/06; H04L 7/042; H04L 27/227
USPC ......... 375/257, 320, 326, 340, 343, 344, 355, 375/362

See application file for complete search history.

(56) References Cited

U.S. PATENT DOCUMENTS

| 5,440,267 A | 8/1995 | Tsuda et al. |
| 5,654,991 A * | 8/1997 | Andren et al. ................. 375/355 |
| 5,661,757 A | 8/1997 | Takahashi et al. |

(Continued)

FOREIGN PATENT DOCUMENTS

| JP | 61-239740 A | 10/1986 |
| JP | 03-117142 A | 5/1991 |
| JP | 05-183593 A | 7/1993 |

(Continued)

OTHER PUBLICATIONS

International Search Report for corresponding International Application No. PCT/JP2010/004451 mailed Oct. 5, 2010.

*Primary Examiner* — Sam K Ahn
*Assistant Examiner* — Syed Haider
(74) *Attorney, Agent, or Firm* — Renner, Otto, Boisselle & Sklar, LLP (57) ABSTRACT

The present invention provides a delay detector circuit that delivers performance at low cost and can reduce power consumption, and a receiver apparatus that uses this delay detector circuit. The delay detector circuit according to the present invention performs a part of decoding processing for decoding data transmitted by a transmitter apparatus based on a received wave of a two-phase modulation method. The receiver apparatus according to the present invention uses the delay detector circuit described above. Therefore the delay detector circuit and receiver apparatus of the present invention deliver performance at low cost and can reduce power consumption.

11 Claims, 5 Drawing Sheets

(56) References Cited

U.S. PATENT DOCUMENTS

| | | | |
|---|---|---|---|
| 2007/0211835 A1* | 9/2007 | Inagawa et al. | 375/343 |
| 2009/0122927 A1* | 5/2009 | Walton et al. | 375/343 |
| 2010/0034297 A1* | 2/2010 | Takasu | 375/257 |
| 2010/0283659 A1* | 11/2010 | Huggett | 342/20 |

FOREIGN PATENT DOCUMENTS

| | | |
|---|---|---|
| JP | 06-232930 A | 8/1994 |
| JP | 06-261030 A | 9/1994 |
| JP | 07-273823 A | 10/1995 |
| JP | 2003-218969 A | 7/2003 |

\* cited by examiner

DELAY DETECTOR CIRCUIT AND RECEIVER APPARATUS

TECHNICAL FIELD

The present invention relates to a delay detector circuit that performs a part of decoding processing for decoding data transmitted by a transmitter apparatus, based on a received wave of a two-phase modulation method, and a receiver apparatus that uses this delay detector circuit.

BACKGROUND ART

Networking is progressing in various technical fields lately due to the advancement of communication technologies, and numerous apparatuses within a building are connected to networks. For example, various apparatuses including illumination, air conditioning, measurement and crime prevention apparatuses are installed in such buildings as apartment houses, government office building, concert halls, commercial buildings, as office buildings and private homes, and these apparatuses are interconnected via predetermined transmission lines to be networked, so it is now possible for a supervisory control apparatus connected to a network to perform centralized supervision and/or control (perform at least one of centralized supervision and centralized control).

In a supervisory control system that performs centralized supervision and/or centralized control by networking a plurality of apparatuses like this, a communication protocol for supervisory control, for transmitting/receiving such data as command data and supervisory data, is used. Examples of the communication protocol for supervisory control are: communication protocols conforming to the RS485 standard, which is a typical communication protocol; LonWorks® (Local Operating Networks), which is an intelligent distributed control network technology developed by Echelon Corporation; and NMAST®, which is advocated by Panasonic Electric Works. Co., Ltd. NMAST® is characterized in that the wiring topologies are free, and pair lines can be used for the transmission lines.

Decoding is required in order to extract data from a communication signal transmitted over such a network. Examples of a decoding method are: a synchronous detection method wherein a signal having a predetermined phase is extracted (carrier wave reproduction) from a communication signal (receive signal) received from the network, and decoding is performed based on this extracted signal (reference phase signal); and a delay detection method wherein decoding is performed by comparing phases of the received waves of adjacent symbols (time slots), that is, by regarding a value of the data as "0" (or "1") if the phase is the same as a signal of the previous symbol (reference signal), and regarding the value of the data as "1" (or "0") if the phase is different from this signal. In the case of the delay detection method, which performs decoding as mentioned above, it is unnecessary to generate the reference phase signal by reproducing the carrier as in the case of the synchronous detection method.

An example of a circuit based on this delay detection method is a delay detector circuit disclosed in Patent Document 1. The delay detector circuit disclosed in Patent Document 1 comprises: a limiter amplifier that transforms an intermediate frequency signal of a received two-phase PSK modulated wave into a rectangular wave signal, and amplifies the rectangular wave; an edge detection unit which extracts only a rise edge of the rectangular wave signal; a sawtooth wave generator that generates a sawtooth wave signal having a cycle based on the frequency of the intermediate frequency signal; a first sample and hold circuit that samples and holds the sawtooth wave signal using the rise edge, and detects a phase of the receive signal as voltage; a second sample and hold circuit that samples and holds the sampled and held signal by a timing signal of which timing is delayed by one symbol; a subtraction circuit that detects a phase difference of adjacent two symbols by subtracting an output signal of one of the sample and hold circuits from that of the other sample and hold circuit; a timing reproduction circuit that generates a symbol timing signal synchronizing with the output signal of the subtraction circuit; and an identification circuit that identifies the output signal of the subtraction circuit, and outputs the reproduced data.

For the delay detector circuit, low cost and low power consumption are demanded in the same way as standard circuits.

Patent Document 1: Japanese Patent Application Laid-Open No. H5-183593

SUMMARY OF THE INVENTION

With the foregoing in view, it is an object of the present invention to provide a delay detector circuit that delivers performance at low cost and can reduce power consumption by using a configuration that is different from the delay detector circuit disclosed in Patent Document 1, and a receiver apparatus that uses this delay detector circuit.

The delay detector circuit according to the present invention performs a part of decoding processing for decoding data transmitted by a transmitter apparatus, based on a received wave of a two-phase modulation method. The receiver apparatus according to the present invention uses this delay detector circuit. Therefore the delay detector circuit and the receiver apparatus according to the present invention deliver performance at low cost and can reduce power consumption.

These and other objectives, features and advantages of the present invention will become more apparent upon reading the following detailed description along with the accompanying drawings.

DESCRIPTION OF EMBODIMENTS

An embodiment of the present invention will now be described with reference to the drawings. Composing elements denoted with a same reference symbol are a same composing element, for which description is omitted unless necessary.

Figure 1:
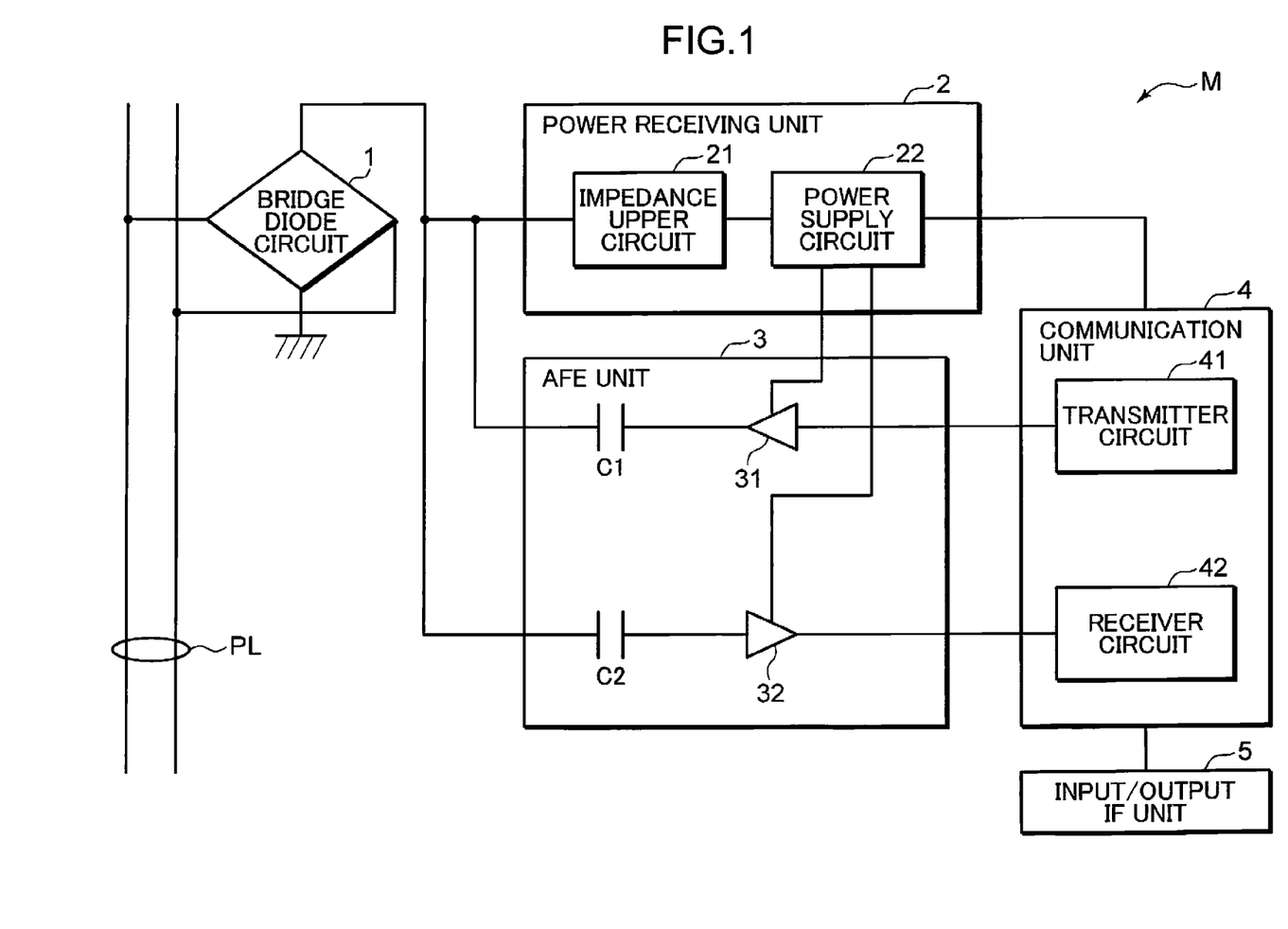
FIG. 1 is a diagram depicting a communication apparatus according to an embodiment.
Figure 2:
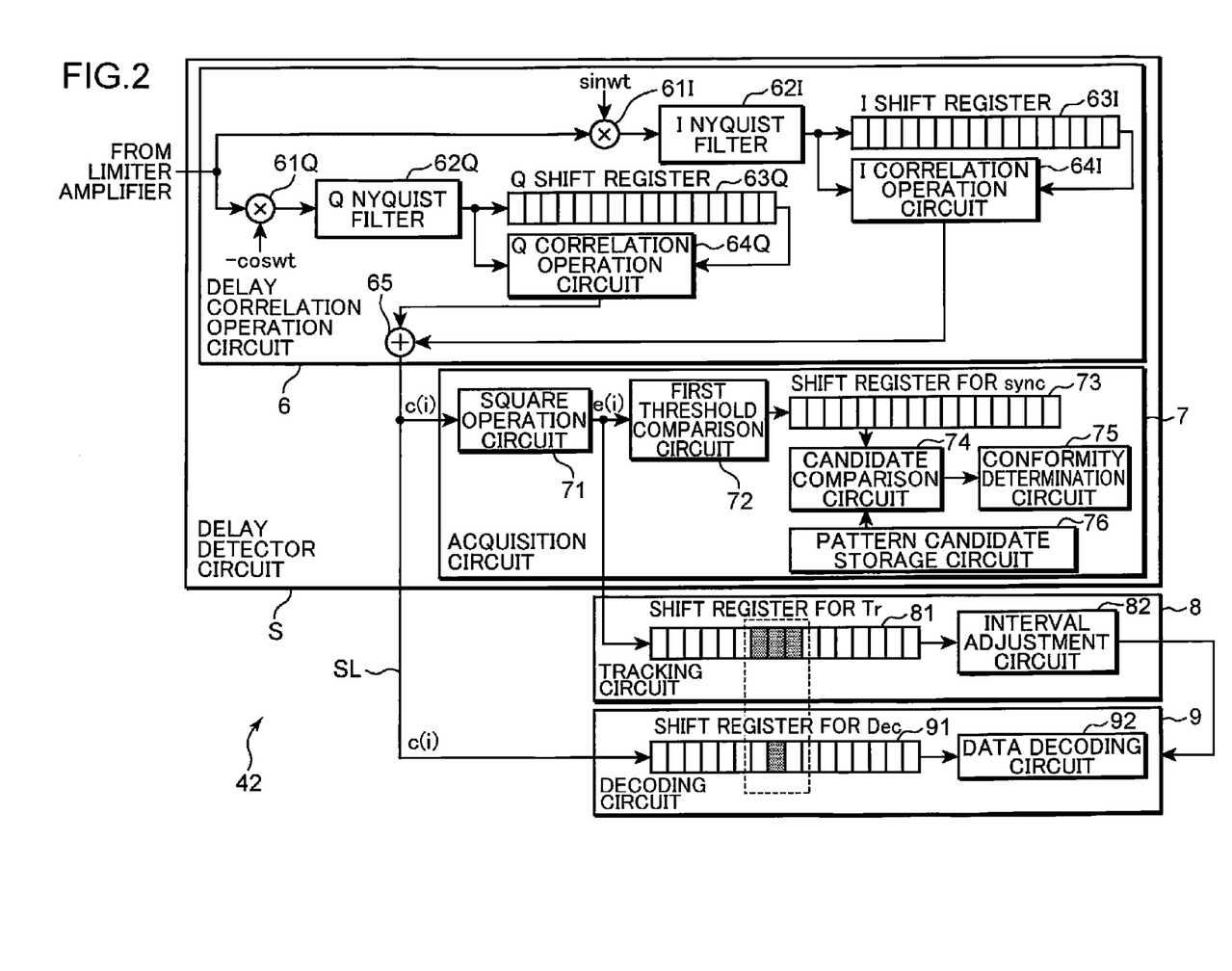
FIG. 2 is a diagram depicting a configuration of a receiver circuit of the communication apparatus shown in FIG. 1.
Figure 3:
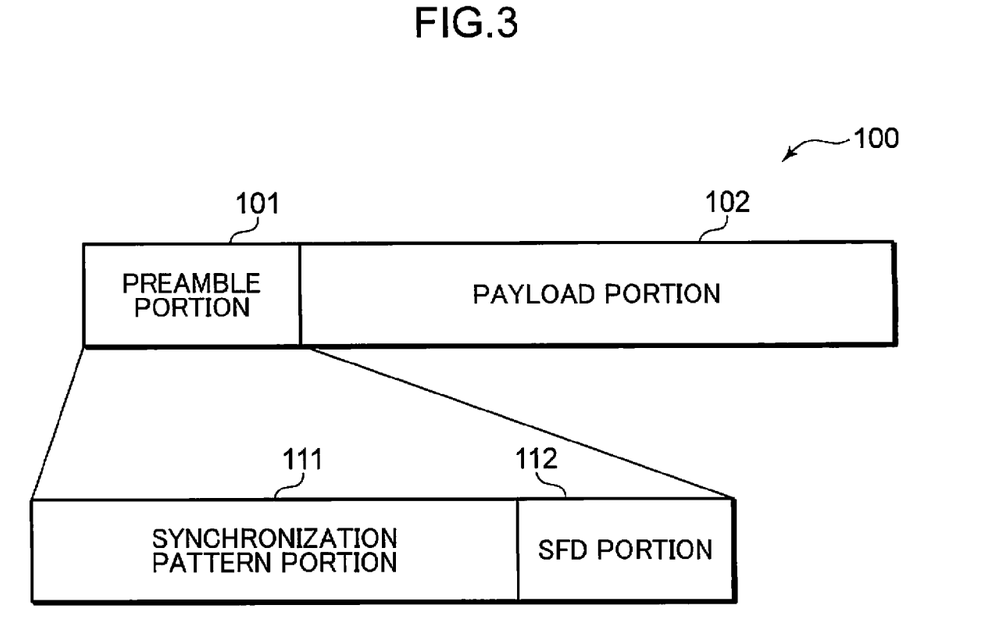
FIG. 3 is a diagram depicting a frame configuration of a communication signal used for the communication apparatus shown in FIG. 1.
Figures 4A, 4B, 4C:
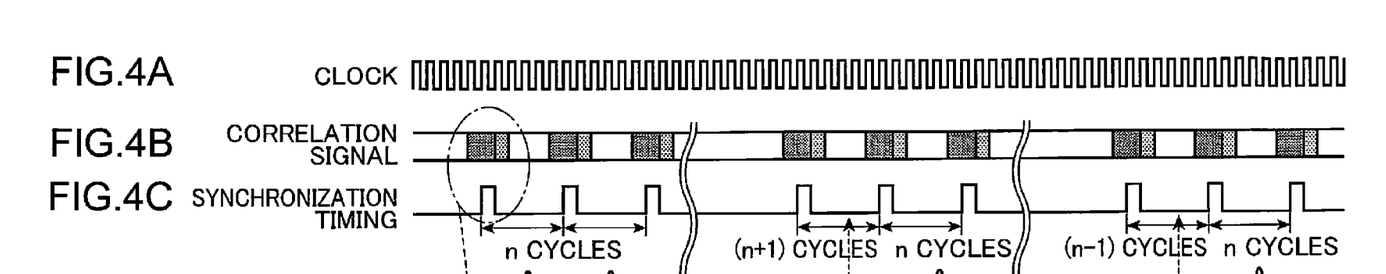
FIG. 4 are diagrams depicting an operation of a tracking unit of the communication apparatus shown in FIG. 1.
Figure 4D:
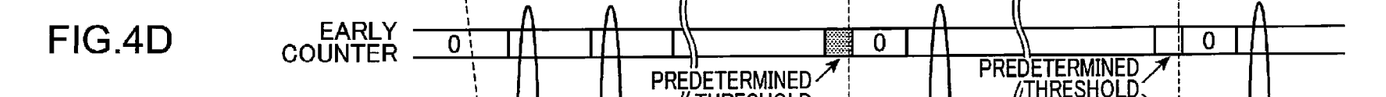
Figure 4E:
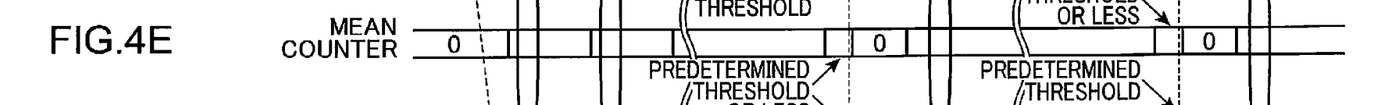
Figures 4F, 4G, 4H:
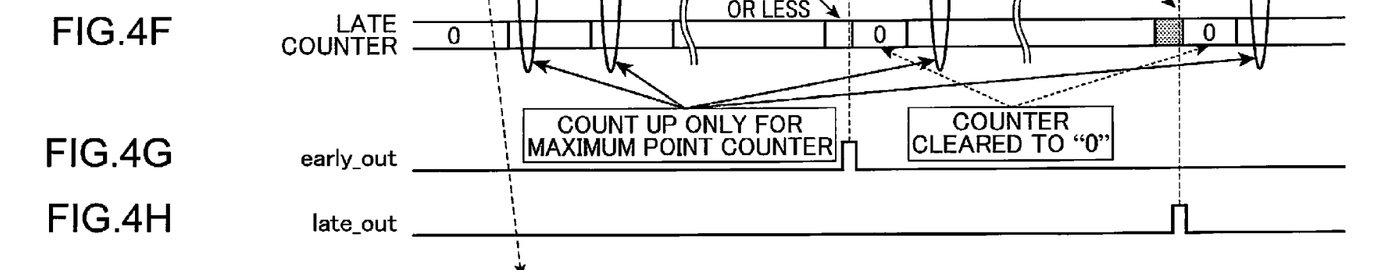
Figure 4I:
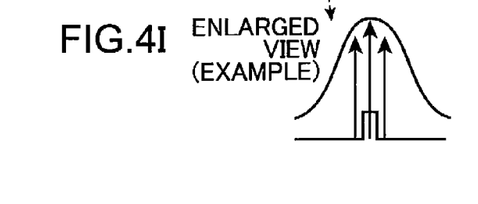
Figure 5A:
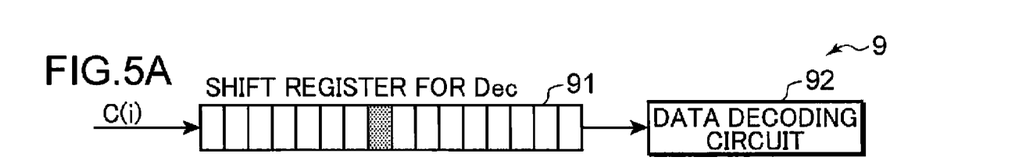
FIG. 5 are diagrams depicting a configuration of a decoding circuit of the communication apparatus shown in FIG. 1.
Figure 5B:
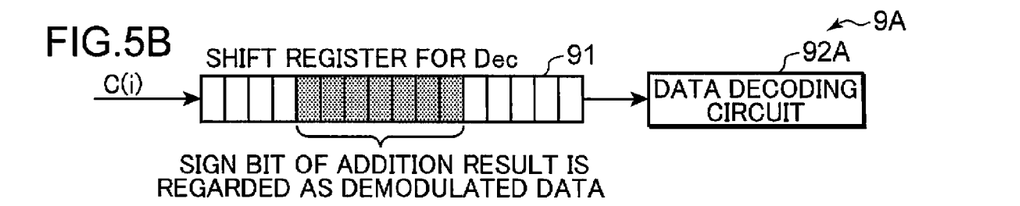

FIG. 1 is a diagram depicting a configuration of a communication apparatus according to an embodiment. FIG. 2 is a diagram depicting a configuration of a receiver apparatus of the communication apparatus of the embodiment. FIG. 3 is a diagram depicting a frame configuration of a communication signal used for the communication apparatus of the embodiment. FIG. 4 are diagrams depicting an operation of a tracking circuit of the communication apparatus of the embodiment. FIG. 5 are diagrams depicting a configuration of a decoding circuit of the communication apparatus of the embodiment. (A) of FIG. 5 show a first configuration of the decoding circuit, and (B) of FIG. 5 show a second configuration of the decoding circuit.

The communication apparatus M of the present embodiment is an apparatus having: a function as a receiver apparatus that receives a communication signal transmitted from another communication apparatus (not illustrated) connected via a network; and a function as a transmitter apparatus that transmits a communication signal to the above mentioned other communication apparatus or still another communication apparatus (not illustrated) via the network. According to the present embodiment, a differential two-phase modulation method (DBPSK), for example, is used for this communication signal, and data to be transmitted is encoded (modulated) by DBPSK, whereby a transmit wave of a communication signal is generated. In the case of DBPSK, a phase change amount between adjacent two symbols is "0" (or "$\pi$") if the value of the data to be transmitted is "0", and the phase change amount is "$\pi$" (or "0") if the value of the data to be transmitted is "1".

This communication apparatus M is connected to a transmission line PL via a bridge diode circuit 1, for example, as shown in FIG. 1, and comprises a power receiving unit 2, an analog front end unit (AFE unit) 3, a communication unit 4, and an input/output interface circuit (input/output IF unit) 5.

The transmission line PL is a medium for propagating (transmitting) a communication signal, and is connected to the network, or constitutes a part of the network. The transmission line PL is a pair of lines, for example, according to the present embodiment. In the present embodiment, the communication apparatus M is connected to the pair of lines via the bridge diode circuit 1, as mentioned above, hence the wiring polarity upon connecting the communication apparatus M to the pair lines is non-polar, and the communication apparatus M can be connected to the pair lines without concern for the polarity of the pair lines. In other words, one terminal and the other terminal of a pair of input ends of the bridge diode circuit 1 can either be connected to a voltage line and a ground line of the pair lines respectively, or connected to a ground line and a voltage line of the pair lines respectively.

The power receiving unit 2 is a circuit that is connected to the bridge diode circuit 1, and generates drive power for driving this communication apparatus M from the power that flows over the transmission line PL via the bridge diode circuit 1. According to the present embodiment, the power receiving unit 2 comprises an impedance upper circuit 21 which becomes high impedance with respect to the communication band of the communication signal that propagates over the transmission line PL, and a power supply circuit 22 that generates DC power from AC power. "High impedance with respect to the communication band" means that the communication signal propagating over the transmission line PL has little influence on the transmission distance. The impedance circuit 21 comprises an inductor which becomes high impedance with respect to the communication band of the communication signal that propagates over the transmission lines PL, for example. The power supply circuit 22 comprises a three-terminal regulator and a capacitor, and generates a drive power having a predetermined constant voltage from AC power.

The power flowing over the transmission line PL is supplied to the power receiving unit 2 via the bridge diode circuit 1. The power receiving unit 2 converts the power supplied via the impedance upper circuit 21 into the drive power having a predetermined constant voltage by the power supply circuit 22, and supplies the predetermined constant voltage to each unit of the communication apparatus M, such as the AFE unit 3 and the communication unit 4, that requires drive power.

The AFE unit 3 is a circuit that is connected to the bridge diode circuit 1, and connects the transmission line PL and the communication unit 4 via the bridge diode circuit 1, and the AFE unit 3 extracts a received wave, namely, a communication signal from the transmission line PL, and outputs the received wave to the communication unit 4, and transmits a transmitted wave, namely, a communication signal from the communication unit 4 to the transmission lines PL via the bridge diode circuit 1. According to the present embodiment, the AFE unit 3 comprises capacitors C1 and C2, an amplifier 31 and a limiter amplifier 32, for example. The capacitors C1 and C2 are elements that cut off the frequency of the power component that flows over the transmission line PL, in other words, the frequency of the power components other than at least the power components of the communication signal. One terminal of the capacitor C1 is connected to the output terminal of the amplifier 31, and the other terminal of the capacitor C1 is connected to the voltage line of the bridge diode circuit 1, whereby the capacitor C1 is disposed between the amplifier 31 and the bridge diode circuit 1. One terminal of the capacitor C2 is connected to the voltage line of the bridge diode circuit 1, and the other terminal of the capacitor C2 is connected to the input terminal of the amplifier 32 which is described later, whereby the capacitor C2 is disposed between the bridge diode circuit 1 and the amplifier 32. The amplifier 31 is a circuit that amplifies a communication signal inputted from the communication unit 4, at a predetermined amplification factor, and the drive power supplied from the power receiving unit 2 is used for driving.

The limiter amplifier 32 is a circuit that transforms the received wave, received from the transmission line PL via the bridge diode circuit 1 and the capacitor C2, into a rectangular wave signal which has an approximately rectangular waveform, by limiting the amplitude of the received wave with a predetermined constant value, and amplifies the rectangular wave signal. The output characteristic of the limiter amplifier 32 has hysteresis, and if a predetermined threshold or higher voltage value is input, the limiter amplifier 32 outputs a predetermined high level voltage value, and if a voltage value less than the predetermined threshold is input, the limiter amplifier 32 outputs a predetermined low level target value. The limiter amplifier 32 is driven by the drive power supplied from the power receiving unit 2 to the amplifier 32.

A communication wave, detected as to a communication signal propagating over the transmission line PL, is received as a received wave via the bridge diode circuit 1, and this received wave is inputted to the limiter amplifier 32 via the capacitor C2 of the AFE unit 3, is transformed into a rectangular wave signal according to the amplitude level of the received wave, and is amplified. The amplified rectangular wave signal, generated from the received wave, is output from the limiter amplifier 32 of the AFE unit 3 to the communication unit 4. The communication signal generated by the communication unit 4 is inputted from the communication unit 4 to the amplifier 31 of the AFE unit 3, is amplified at a predetermined amplification factor, and is transmitted to the transmission line PL via the capacitor C1 and the bridge diode circuit 1.

According to the present embodiment, the limiter amplifier 32 may be an active filter having a function of a bandpass filter (BPF), which extracts only the communication band (transmission band) used for the communication. Thereby signals having a frequency other than the above mentioned transmission band can be removed as noise.

The communication unit 4 is a circuit that is connected to the power receiving unit 2 and the AFE unit 3 respectively, and decodes (demodulates) data of a communication signal based on a rectangular wave signal inputted from the limiter amplifier 32 of the AFE unit 3, and also encodes (modulates) data to be transmitted as a communication signal. According to the present embodiment, the communication unit 4 comprises a transmitter circuit 41 that encodes (modulates) the data to be transmitted as a communication signal, and a receiver circuit 42 that decodes (demodulates) the data of the communication signal based on the output of the limiter amplifier 32 of the AFE unit 3. Details on the receiver circuit 42 are described later.

The input/output IF unit 5 is an interface circuit that is connected to the communication unit 4, so that data can be inputted/outputted between this communication apparatus M and an external apparatus. When the external apparatus is connected to the input/output IF unit 5, the data inputted from the external apparatus to the input/output IF unit 5 is outputted to the transmitter circuit 41 of the communication unit 4, and encoded (modulated) by the transmitter circuit 41 of the communication unit 4, and data decoded (demodulated) by the receiver circuit 42 of the communication unit 4, on the other hand, is outputted to the input/output IF unit 5, and is outputted to the external apparatus.

As FIG. 2 shows, the receiver circuit 42 comprises a delay detector circuit S, a tracking circuit 8 and a decoding circuit 9, for example.

The delay detector circuit S is a circuit that is connected to the output terminal of the limiter amplifier 32 of the AFE unit 3, so that the output of the limiter amplifier 32 is inputted, and detects whether a received wave is a communication signal. More specifically, the delay detector circuit S comprises: a delay correlation operation circuit 6 that performs the delay correlation operation on the received wave; an acquisition circuit 7 that detects whether the received wave is a communication signal transmitted by the other communication apparatus based on the output of the delay correlation operation circuit 6; and an output unit SL that outputs the output of the delay correlation operation circuit 6 to the decoding circuit 9 that decodes data based on the output of the delay correlation operation circuit 6. According to the present embodiment, the acquisition circuit 7 operates first and acquires a communication signal transmitted by the other transmitter apparatus based on the output of the delay correlation operation circuit 6. Then the later mentioned decoding circuit 9 operates and detects the later mentioned end of the preamble unit.

According to the present embodiment, the output unit SL has wiring that connects the delay correlation operation circuit 6 and the decoding circuit 9 (e.g. including a lead line, a wiring pattern on a board, and a wiring pattern on an integrated circuit). The output unit SL is not limited to this wiring, but may be a terminal for outputting the output of the delay correlation operation circuit 6, for example.

The delay correlation operation circuit 6 is connected to the limiter amplifier 32 of the AFE unit 3, and comprises an I multiplier (I mixer) 61I, an I Nyquist filter 62I, an I shift register 63I, an I correlation operation circuit 64I, a Q multiplier (Q mixer) 61Q, a Q Nyquist filter 62Q, a Q shift register 63Q, a Q correlation operation circuit 64Q, and an adder 65, for example. The output of the limiter amplifier 32 of the AFE unit 3 is sampled at a predetermined sampling interval, is input to the receiver circuit 42, and is input to the delay correlation operation circuit 6. The sampling interval is determined by a so called sampling theorem, but in the present embodiment, the setup is such that a waveform of one symbol is sampled at a predetermined n number of sampling points, which are set in advance.

The I multiplier 61I is a circuit that is connected to the limiter amplifier 32 of the AFE unit 3, and generates an I signal component by multiplying the output of the limiter amplifier 32 by sin $\omega t$ of the local frequency $\omega$. The I Nyquist filter 62I is a circuit that is connected to the I multiplier 61I, and filters the I signal component outputted from the I multiplier 61I using a predetermined Nyquist filter characteristic. The Nyquist filter for reception is configured so as to have the Nyquist characteristic as a set with the Nyquist filter for transmission. The I shift register 63I is a circuit that is connected to the I Nyquist filter 62I, and stores the output of the I Nyquist filter 62I as a predetermined number of bits of data. In the present embodiment, the receiver circuit 42 is configured in such a way that a waveform of one symbol is sampled at n number of sampling points, hence the I shift register 63I is constituted by n bits, so that data for one symbol can be stored. The shift register is a digital circuit in which a plurality of flip-flops, each of which stores 1-bit data (value), are cascade-connected, and 1-bit data is sequentially shifted within the circuit. The I correlation operation circuit 64I is a circuit that is connected to the I Nyquist filter 62I and the I shift register 63I, and performs the correlation operation between the output of the I Nyquist filter 62I and the output of the I shift register 63I. Thereby the delay correlation operation is performed for the I signal component.

In the same manner, the Q multiplier 61Q is a circuit that is connected to the limiter amplifier 32 of the AFE unit 3, and generates a Q signal component by multiplying the output of the limiter amplifier 32 by $-\cos \omega t$ of the local frequency $\omega$. The Q Nyquist filter 62Q is a circuit that is connected to the Q multiplier 61Q, and filters the Q signal component outputted from the Q multiplier 61Q using a predetermined Nyquist filter characteristic. The Nyquist filter for reception is configured so as to have the Nyquist characteristic as set with the Nyquist filter for transmission. The Q shift register 63Q is a circuit that is connected to the Q Nyquist filter 62Q, and stores the output of the Q Nyquist filter 62Q as a predetermined number of bits of data. The Q shift register 63Q is constituted by n bits so that data for one symbol can be stored. The Q correlation operation circuit 64Q is a circuit that is connected to the Q Nyquist filter 62Q and the Q shift register 63Q, and performs correlation operation between the output of the Q Nyquist filter 62Q and the output of the Q shift register 63Q. Thereby the delay correlation operation is performed for the Q signal component.

The adder 65 is a circuit that is connected to the I correlation operation circuit 64I and the Q correlation operation circuit 64Q respectively, and adds the output of the I correlation operation circuit 64I and the output of the Q correlation operation circuit 64Q. The result of this addition is output to the acquisition circuit 7 and the decoding circuit 9 respectively by the output unit SL as the output of the delay correlation operation circuit 6.

This acquisition circuit 7 is connected to the delay correlation operation circuit 6, and comprises a square operation circuit 71, a first threshold comparison circuit 72, a shift register for sync 73, a candidate comparison circuit 74, a conformity determination circuit 75, and a pattern candidate storage circuit 76, for example, as shown in FIG. 2.

The square operation circuit 71 is a circuit that is connected to the adder 65 of the delay correlation operation circuit 6, and computes a square of the output of the delay correlation operation circuit 6, that is the output of the adder 65. The first threshold comparison circuit 72 is a circuit that is connected to the square operation circuit 71, and binarizes the output of the square operation circuit 71 by comparing the output of the square operation circuit 72 (square result) and a predetermined first threshold Th1, which is set in advance. The shift register for sync 73 is a circuit that is connected to the first threshold comparison circuit 72, and stores the output of the first threshold comparison circuit 72 (first threshold comparison result) as a predetermined number of bits of data. The shift register for sync 73 is constituted by n bits, so that data for one symbol can be stored.

The output of the delay correlation operation circuit 6 is squared by the square operation circuit 71, the square result is compared with the predetermined first threshold Th1 by the first threshold comparison circuit 72, and the first threshold comparison result is stored in the shift register for sync 73. Thereby a shape of one symbol is generated based on the output of the delay correlation operation circuit 6, and the shape of one symbol based on the delay correlation operation circuit 6 is stored in the shift register for sync. Thus the shape of one symbol is represented by a plurality of bits. The square operation circuit 71, the first threshold comparison circuit 72 and the shift register for sync 73 constitute a shape generation unit that generates a shape of one symbol based on the output of the delay correlation operation circuit 6, and correspond to examples of the shape generation unit.

The pattern candidate storage circuit 76 is a circuit that stores in advance a plurality of candidates of the shape of one symbol as a pattern candidate. The pattern candidate has a predetermined bit pattern formed by predetermining a value of each bit, and the plurality of pattern candidates has mutually different bit patterns, and in at least one of the plurality of pattern candidates, at least one bit has an arbitrary value.

The frame 100 of the communication signal has a preamble portion 101 and a payload portion 102 for storing data to be transmitted, for example, as shown in FIG. 3, and the preamble portion 101 has: a synchronization pattern unit 111 that stores a synchronization pattern used for synchronizing the decoding timing with the received wave in order to decode the data from the received wave; and an SFD unit 112 which irradiates the end of the synchronization pattern unit 111. The SFD unit 112 indicates the end of the preamble portion 101, and also indicates the start of the payload portion 102.

According to the present embodiment, "111 . . . 111", for example, is stored in the synchronization pattern unit 111 as a synchronization pattern, and "1010", for example, is stored in the SFD unit 112. In DBPSK, a phase change amount between two adjacent symbols and a value of data are corresponded, as mentioned above. In the case of DBPSK, if 111 . . . 111 is set, the phase inverts each time, therefore "111 . . . 111" is used for the synchronization pattern so as to perform synchronization easily.

In the case of sampling one symbol at n number of sampling points, if the result of the delay correlation operation is squared and if the squared result is compared with the first threshold, then the result is "1" near the center of 16 sampling points, and is "0" in the rest of the area if the received wave barely has noise (noise is barely superposed on the received wave), that is, "00 . . . 01110 . . . 00", or 00 . . . 00100 . . . 00", for example. However, if noise is superposed on the received wave, or if the phase is shifted, "1" may appear in a place not near the center of the n number of sampling points in the first threshold determination result. Therefore according to the present embodiment, a plurality of pattern candidates is stored in the pattern candidate storage circuit 76, and the plurality of pattern candidates includes a pattern that has "1" in a place not near the center of the n sampling points, and a pattern in which a place not near the center of the n sampling points is not defined (data value is arbitrary, that is, the data value can be either "0" or "1"). The plurality of pattern candidates are predetermined considering the topology of the transmission line used by this communication apparatus and the transmission characteristic thereof (e.g. determines how phases are distorted), for example, and not only the two patterns "00 . . . 01110 . . . 00" and "00 . . . 00100 . . . 00", but also such patterns as "00 . . . 011110 . . . 00" and "00 . . . 1XX1111XXX1 . . . 00" are included. "X" indicates either "0" or "1". Thus the pattern candidates are bit patterns generated by predetermining a value of each bit, and the plurality of pattern candidates has mutually different bit patterns, and in at least one of the plurality of pattern candidates, at least one of the bits has an arbitrary value.

The candidate comparison circuit 74 is a circuit that is connected to the shift register for sync 73 and the pattern candidate storage circuit 76 respectively, and compares a shape of one symbol stored in the shift register for sync 73 and each shape of a plurality of pattern candidates stored in the pattern candidate storage circuit 76. Upon comparing the shape of one symbol stored in the shift register for sync 73 and each shape of the plurality of pattern candidates stored in the pattern candidate storage circuit 76, the candidate comparison circuit 74 compares each value stored in each bit of the shift register for sync 73 and each value of each bit of a pattern candidate.

The conformity determination circuit 75 is a circuit that is connected to the candidate comparison circuit 74, and regards the received wave as a communication signal transmitted by another communication apparatus if the shape of one symbol of the shift register for sync 73 and any one of the plurality of pattern candidates match for a plurality of times with an n sample interval (one symbol interval) as a result of comparison by the candidate comparison circuit 74 that is input by the candidate comparison circuit 74. The number of matches can be two, three or four times, for example. The determination accuracy improves as the number of matches increases, but the determination time becomes lengthy.

The tracking circuit 8 is a circuit that is connected to the delay detector circuit S, and adjusts the time interval corresponding to the length of one symbol when a predetermined processing is performed with the time interval, so that decoding can be performed at a center time position in one symbol. In the present embodiment, the predetermined processing is the decoding processing by the data decoding circuit 92 for the shift register for Dec 91 of the decoding circuit 9. More specifically, the tracking circuit 8 comprises a shift register for Tr 81 and an interval adjustment circuit 82, for example, as shown in FIG. 2.

The shift register for Tr 81 is a circuit that is connected to the square operation circuit 71 of the delay detector circuit S, and stores the squared result generated by squaring one symbol of the output of the delay correlation operation circuit 6 by the square operation circuit 71. The internal adjustment circuit 82 is a circuit that is connected to the shift register for Tr 81, compares, in the square result for one symbol stored in the shift register for Tr 81, a sampling value (mean value) at a center position located approximately at the center, a sampling value (early value) located at a preceding time position, which is one sampling before the center time position, and a sampling value (late value) located at a subsequent time point, which is one sampling after the center time point, and adjusts the time interval according to the comparison result. More specifically, the mean value, the early value and the late value are compared at every n cycle, and one point is added to the counter indicating the highest value in the comparison result, out of a MEAN counter, an EARLY counter and a LATE counter, which correspond to the mean value, the early value and the late value respectively. If the value of the MEAN counter exceeds the predetermined second threshold Th2, the time adjustment circuit 82 operates the decoding circuit 9 so that the current time interval is maintained. If the value of the EARLY counter exceeds the predetermined second threshold Th2, the time adjustment circuit 82 operates the decoding circuit 9 so that the current time interval increases by one sample length. If the value of the LATE counter exceeds the predetermined second threshold Th2, the time adjustment circuit 82 operates the decoding circuit 9 so that the current time interval decreases by one sample length.

According to the present embodiment, each circuit operates according to the clock timing of the operation clock, and one symbol is sampled at n number of sampling points, so if the value of the MEAN counter exceeds the predetermined second threshold Th2, as shown in FIG. 4, this means that the approximately center time position of the symbol and the timing for the decoding circuit 9 to decode the data match (see (I) of FIG. 4), therefore the time adjustment circuit 82 operates the decoding circuit 9 at an n cycle interval (see (A), (B), (C) and (E) of FIG. 4), so as to maintain the current synchronization timing. If the value of the EARLY counter exceeds the predetermined second threshold Th2, this means that the timing for the decoding circuit 9 to decode data is before the approximately center time position of the symbol (see (I) of FIG. 4), therefore the time adjustment circuit 82 outputs an early_out signal so as to delay the current synchronization timing, whereby the decoding circuit 9 is operated at an (n+1) cycle interval only once (see (A), (B), (C), (D) and (G) of FIG. 4). If the value of the LATE counter exceeds the predetermined second threshold Th2, this means that the timing for the decoding circuit 9 to decode data is after the appropriate center time position of the symbol (see (I) of FIG. 4), therefore the time adjustment circuit 82 outputs a late_out signal so as to advance the current synchronization timing, whereby the decoding circuit 9 is operated at an (n−1) cycle interval only once (see (A), (B), (C), (F) and (H) of FIG. 4).

(A) of FIG. 4 shows a clock for synchronizing operation timing of each circuit of the communication unit 4, (B) of FIG. 4 shows each bit value (correlation signal) of the shift register for Tr 81, (C) of FIG. 4 shows a synchronization timing established by the delay detector circuit S, (D) of FIG. 4 shows the EARLY counter, (E) of FIG. 4 shows the MEAN counter, (F) of FIG. 4 shows the LATE counter, (G) of FIG. 4 shows the early_out signal, (H) of FIG. 4 shows the late_out signal, and (I) of FIG. 4 is a partially enlarged view of (B) of FIG. 4 and (C) of FIG. 4.

The decoding circuit 9 is a circuit that is connected to the delay correlation operation circuit 6 of the delay detector circuit S via the output unit SL, and decodes data based on the output of the delay correlation operation circuit 6. More specifically, the decoding circuit 9 comprises a shift register for Dec 91 and a data decoding circuit 92, for example, as shown in FIG. 2 ((A) of FIG. 5).

The shift register for Dec 91 is a circuit that is connected to the delay correlation operation circuit 6 of the delay detector circuit S via the output unit SL, and stores the output of the delay correlation operation circuit 6 for one symbol. The data decoding circuit 92 is a circuit that is connected to the shift register for Dec 91, and decodes data based on the value at a center position located approximately at the center of the shift register for Dec 91. More specifically, the communication signal is encoded by DBPSK, hence the data decoding circuit 92 generates the decoded data by corresponding the sign bit of the value at the center position (bit at the center position) located approximately at the center of the shift register for Dec 91 to "1" or "0".

The decoding circuit 9 may have a configuration shown in (B) of FIG. 5 instead of the configuration shown in FIG. 2 ((A) of FIG. 5). In other words, as (B) of FIG. 5 shows, the decoding circuit 9A comprises a shift register for Dec 91 and a data decoding circuit 92A. The shift register for Dec 91 is a circuit that is connected to the delay correlation operation circuit 6 if the delay detector circuit S via the output unit SL, and stores an output of the delay correlation operation circuit 6 for one symbol. The data decoding circuit 92A is a circuit that is connected to the shift register for Dec 91, and decodes data based on a value at a center position located approximately at the center of the shift register for Dec 91, and a value at a preceding time position that precedes the center position, and a value at a subsequent time position that is subsequent to the center position (each value of a predetermined number of bits (1 or a plurality of bits) located immediately before and immediately after the center position). More specifically, the communication signal is encoded by DBPSK, hence the data decoding circuit 92A generates the decoded data by corresponding the sign bit of the sum of the value at the center position located approximately at the center of the shift register for Dec 91 (value of a bit at the center position), the value at the preceding time position preceding the center position, and the value at the subsequent time position subsequent to the center position (e.g. each value of a predetermined number of bits (1 or a plurality of bits) located immediately before and immediately after the center position) to "1" or "0". The number of bits before and after the center position is 3 bits before and 3 bits after the center position in the example shown in (B) of FIG. 5, but the present embodiment is not limited to this, and may be 2 bits before and 2 bits after the center position, or 1 bit before and 1 bit after the center position. Thus according to the decoding circuit 9A having the configuration shown in (B) in FIG. 5, not only a value at the center position located roughly at the center of the shift register for Dec 91, but also a value at a preceding position of the center position and a value at a subsequent position of the center position, such as the values located immediately before and immediately after the center position, are used for decoding data, therefore the data can be decoded more accurately at a higher precision.

The receive operation of the communication apparatus M of the present embodiment will now be described. When the communication apparatus M of the present embodiment starts operation by turning a power supply switch (not illustrated) ON and starts the receive operation for receiving a communication signal, the communication apparatus M loads a received wave from the transmission line PL to the AFE unit 3 via the bridge diode circuit 1, regardless whether a communication signal exists. The loaded received wave is input to the limiter amplifier 32 via the capacitor C2, and is transformed into a waveform according to the amplitude level of the received wave by the limiter amplifier 32, and the waveform-transformed received wave is output from the limiter amplifier 32 to the receiver circuit 42 of the communication unit 4.

In the receiver circuit 42, delay detector circuit S performs the delay detection. More specifically, the waveform-transformed received wave is input to the I multiplier 61I and the Q multiplier 61Q respectively.

In the I multiplier 61I, the waveform-transformed received wave is multiplied by the sin ωt, and the I signal component generated by this multiplication is input to the I Nyquist filter 62I. In the I Nyquist filter, the I signal component is filtered by the filter characteristic of the Nyquist filter, which is implemented by a set of the Nyquist filter for reception and the Nyquist filter for transmission, and the filtered I signal component is input to the I shift register 63I and the I correlation operation circuit 64I. In the I shift register 63I, the filtered I signal component sequentially shifts from the bit (flip-flop) of the input terminal to the bit (flip-flop) of the output terminal according to the clock timing of the operation clock, and is input to the I correlation operation circuit 64I. In the I correlation operation circuit 64I, correlation operation (multiplication) is performed on the filtered I signal component inputted from the I Nyquist filter 62I and the filtered I signal component one symbol ago, which was inputted from the I shift register 63I according to the clock timing of the operation clock, and the result of the correlation operation is input to the adder 65.

In the same manner, in the Q multiplier 61Q, the waveform-transformed received wave is multiplexed by the −cos ωt, and the Q signal component generated by this multiplication is input to the Q Nyquist filter 62Q. In the Q Nyquist filter, the Q signal component is filtered by the filter characteristic of the Nyquist filter, which is implemented by a set of the Nyquist filter for reception and the Nyquist filter for transmission, and the filtered Q signal component is input to the Q shift register 63Q and the Q correlation operation circuit 64Q. In the Q shift register 63Q, the filtered Q signal component sequentially shifts from the bit (flip-flop) of the input terminal to the bit (flip-flop) of the output terminal according to the clock timing of the operation clock, and is input to the Q correlation operation circuit 64Q. In the Q correlation operation circuit 64Q, correlation operation (multiplication) is performed on the filtered Q signal component inputted from the Q Nyquist filter 62Q and the filtered Q signal component one symbol ago, which was inputted from the Q shift register 63Q according to the clock timing of the operation clock, and the result of the correlation operation is input to the adder 65.

The result of the correlation operation of the I correlation operation circuit 64I and the result of the correlation operation of the Q correlation operation circuit 64Q are added in the adder 65, and this addition result is outputted to the output unit SL, and is inputted to the acquisition circuit 7 and the decoding circuit 9 respectively.

Here if the receive wave is S(i), the real part of the received weave S(i) is I(i), the imaginary part of the received wave S(i) is Q(i) and the imaginary unit is j($j^2=-1$), then the received wave S(i) is given by S(i)=I(i)+jQ(i), and the received wave S(i−T) one symbol ago is given by S(i−T)=I(i−T)+jQ(i−T). The time T is a time length of one symbol. According to the communication apparatus M of the present embodiment, a waveform of one symbol is sampled at n number of sampling points, therefore T=n×sampling interval. i is a clock number of the operation clock. Under these definitions, the delay correlation value c(i) is given by c(i)=(I(i)+jQ(i))·(I(i−T)−jQ(i−T))=[I(i) I(i−T)+Q(i) Q(i−T)]+j[Q(i) I(i−T)−I(i) Q(i−T)]=A+jB, A=I(i) I(i−T)+Q(i) Q(i−T), B=Q(i) I(i−T)−I(i) Q(i−T). According to the communication apparatus M of the present embodiment, which is based on DBPSK, the above mentioned operation is performed by the above mentioned configuration, ignoring the imaginary part B, and only the real part A is used for the decoding circuit.

In the acquisition circuit 7, the addition result (delay correlation value c(i)=A) inputted from the delay correlation operation circuit 6 to the acquisition circuit 7 is inputted to the square operation circuit 71 first. In the square operation circuit 71, the delay correlation value A is squared, and this square result (e(i)=$A^2$=((I(i) I(i−T))+(Q(i) Q(i−T))$)^2$ is inputted to the first threshold comparison circuit 72. In the first threshold comparison circuit 72, this square result $A^2$ is compared with the predetermined first threshold Th1 and binarized, and this binarized square result $A^{2t}$ is inputted to the shift register for sync 73. In other words, if the square result $A^2$ is smaller than the predetermined first threshold Th1, "0" is input, and if the square result $A^2$ is the predetermined first threshold Th1 or greater, "1" is input. In the shift register for sync 73, this binarized square result $A^{2t}$ sequentially shifts from the bit (flip-flop) of the input terminal to the bit (flip-flop) of the output terminal according to the clock timing of the operation clock. The candidate comparison circuit 74 compares the shape of one symbol in the shift register for sync 73 and a shape of each of the plurality of pattern candidates in the pattern candidate storage circuit 76 at each clock timing of the operation clock, and the comparison result is input to the conformity determination circuit 75. This comparison is executed by comparing corresponding bits. In the conformity determination circuit 75, a number of times when the shape of one symbol in the shift register for sync 73 and any one of the plurality of pattern candidates in the pattern candidate storage circuit 76 match in the comparison by the candidate comparison circuit 74 is counted based on the comparison result.

By each bit of the synchronization pattern that is received successively, the matched comparison result is input from the candidate comparison circuit 74 to the conformity determination circuit 75 in the receiver circuit 42, and the number of times of the match is counted up in the conformity determination circuit 75 based on the comparison result. According to the present embodiment, one symbol is sampled at n number of sampling points, therefore if the first match is determined, the acquisition circuit 7 judges the second match at each point of (n−1) sampling points after the determination of the first match, n sampling points after the determination of the first match, and (n+1) sampling points after the first determination of match, in order to perform the judgment efficiently. The acquisition circuit 7 may be configured so that the judgment of match is performed n sampling pints after the determination of the first match, but a more accurate synchronization pattern can be acquired if the judgment is performed not only n sampling points later, but also (n−1) sampling points later and (n+1) sampling points later, which are the timings before and after the n sampling points, as mentioned above. Furthermore according to the present embodiment, if the second match is determined, the acquisition circuit 7 judges the third match at each point of (2n−2) sampling points after the determination of the first match, (2n−1) sampling points after the determination of the first match, 2n sampling points after the determination of the first match, (2n+1) sampling points after the determination of the first match, and (2n+2) sampling points after the determination of the first match. The acquisition circuit 7 may be configured so that the judgment of match is performed 2n sampling points after the determination of the first match, or (n−1) sampling after, n sampling after and (n+1) sampling after the determination of the second match.

If the number of times of match becomes three, it is regarded as the detection of the preamble portion 101, and synchronization is acquired based on the delayed detection. After this synchronization acquisition, the conformity determination circuit 75 of the acquisition circuit 7 allows the tracking circuit 8 to start the tracking operation, and allows the decoding circuit 9 to start the decoding operation.

When the tracking operation is started in the tracking circuit 8, the square result (e(i)=$A^2$), inputted from the square operation circuit 71 of the acquisition circuit 7, sequentially shifts from the bit (flip-flop) of the input terminal to the bit (flip-flop) of the output terminal in the shift register for Tr 81, according to the clock timing of the operation clock. According to the synchronization acquired by the delay detector circuit S, the time adjustment circuit 82 compares a sampling value (mean value) at a center position located approximately at the center of the shift register for Tr 81, a sampling value (early value) at a preceding time position that is one sampling point before the center position, and a sampling value (late value) at a subsequent time position that is one sampling point after the center position, and adjusts the time interval according to the comparison result. More specifically, as described with reference to FIG. 4, if the value of the MEAN counter exceeds the predetermined second threshold Th2, the interval adjustment circuit 82 operates the decoding circuit 9 with n cycles as the time interval, so that the current synchronization timing is maintained. If the value of the EARLY counter exceeds the predetermined second threshold Th2, the interval adjustment circuit 82 operates the decoding circuit 9 with the (n+1) cycle as the time interval only once, so as to delay the current synchronization timing. If the LATE counter exceeds the second threshold Th2, the interval adjustment circuit 82 operates the decoding circuit 9 with the (n−1) cycle as the time interval only once, so as to advance the current synchronization timing.

When the decoding operation is started in the decoding circuit 9, the delay correlation value c(i) (=A), inputted from the delay correlation operation circuit 6 of the delay detector circuit S, sequentially shifts from the bit (flip-flop) of the input terminal to the bit (flip-flop) of the output terminal in the shift register for Dec 91, according to the clock timing of the operation clock. The data decoding circuit 92 corresponds the sign bit of the value at the center position (bit at the center position) located approximately at the center of the shift register for Dec 91 to "0" or "1" as the decoding data, according to the synchronization acquired by the delay detector circuit S.

In the case of using the data decoding circuit shown in (B) of FIG. 5, instead of the data decoding circuit 92, the data decoding circuit 92A corresponds the sign bit of the sum of the value at the center position located approximately at the center of the shift register for Dec 91 (value of the bit at the center position) and each value located immediately before and after the center position (each value of each bit before and after the bit at the center position) to "0" or "1" as the decoding data, according to the synchronization established by the delay detector circuit S.

Then the acquisition circuit 7 checks the data decoded like this by the decoding circuit 9 after the synchronization acquisition, and detects the end of the preamble portion 101 by detecting the bit pattern of the SFD unit 112 of the preamble portion 101, such as the above mentioned "1010", whereby synchronization with the transmit signal is established.

By this operation, if a communication signal propagates through the transmission line PL, the communication apparatus M can perform delay detection on the communication signal, and decode data from the communication signal.

In the communication apparatus M and the delay detector circuit S of the present embodiment, delay detection is performed by the delay correlation operation circuit 6 performing the delay correlation operation on a received wave, and the acquisition circuit 7 determines whether this received wave is a communication signal transmitted by the transmitter apparatus based on the output of the delay correlation operation circuit 6. Then the result of the delay correlation operation (delay correlation value c(i) (=A)) generated during the delay detection processing is output to the decoding circuit 9 via the output unit SL. Comparing with a typical receiver apparatus, which divides the received wave into two and performs delay detection using one of the received waves and performs decoding using the other received wave, the communication apparatus M and the delay detector circuit S of the present embodiment, where a part of the delay detector circuit is used for the decoding processing, have low cost and can reduce power consumption.

In the communication apparatus M and the delay detector circuit S of the present embodiment, a plurality of candidates of a shape of one symbol (pattern candidates) is provided, and the plurality of pattern candidates is stored in the pattern candidate storage circuit 76 in advance. Therefore it is easier to determine whether the received wave is a communication signal transmitted by another communication apparatus, and the communication apparatus M and the delay detector circuit S of the present embodiment can acquire the received wave with certainty. On the other hand, if a shape of one symbol in the shift register for sync 73 and any one of the plurality of pattern candidates match a plurality of times, the communication apparatus M and the delay detector circuit S of the present embodiment regard this received wave as a communication signal transmitted by another communication apparatus (synchronization acquisition). Therefore the communication apparatus M and the delay detector circuit S of the present embodiment can determine that this received wave is a communication signal transmitted by another communication apparatus, and accurately perform delay detection.

According to the communication apparatus M and the delay detector circuit S of the present embodiment, in at least one of the plurality of pattern candidates, at least one of the bits has an arbitrary value. Therefore even if the shape of the symbol becomes different from the waveform transmitted by another communication apparatus during transmission, this received wave can be determined as the communication signal transmitted by the other communication apparatus, and the communication apparatus M and the delay detector circuit S of the present embodiment can acquire the received wave with certainty.

The communication apparatus M and the delay detector circuit S of the present embodiment can correct the shift of the clock interval of another communication apparatus and the clock interval of the communication apparatus M since the tracking circuit 8 is included, and the delay detection can be performed with certainty.

The communication apparatus M and the delay detector circuit S of the present embodiment can decode data based on the received wave, since the decoding circuit 9 is included.

In the case of a typical conventional means, an auto gain control amplifier (AGC amplifier) and an analog-digital converter (AD convertor) are used for the circuit before the input of the receiver circuit, and the received wave loaded from the transmission line PL is adjusted to have an appropriate amplitude by the AGC amplifier, is converted from the analog signal to the digital signal by the AD converter, and is input to the receiver circuit. In the case of the communication apparatus M of the present embodiment, on the other hand, the limiter amplifier 32 is used for the circuit before the input of the receiver circuit 42, as mentioned above, and the received wave loaded from the transmission line PL is transformed into a rectangular wave signal by the limiter amplifier 32, and is inputted to the receiver circuit 42. Thus in the case of the communication apparatus M of the present embodiment using the limiter amplifier 32, instead of the conventional means of an AGC amplifier and AD converter, the circuit scale becomes smaller, and as a result, the communication apparatus M of the present embodiment has less cost and can reduce power consumption.

According to the communication apparatus M of the present embodiment, the above mentioned communication apparatus based on the low-speed DLC transmission method is implemented at low cost and low power consumption.

Although the present description discloses various aspects of the techniques, as mentioned above, major techniques thereof will be summarized.

A delay detector circuit according to an aspect is a delay detector circuit that performs a part of decoding processing for decoding data transmitted by a transmitter apparatus based on a received wave of a two-phase modulation method, this circuit comprising: a limiter amplifier that transforms the received wave into a rectangular wave signal and amplifies the rectangular wave signal; a delay correlation operation unit that performs a delay correlation operation on an output of the limiter amplifier; an acquisition unit that determines whether the received wave is a communication signal transmitted by the transmitter apparatus based on the output of the delay correlation operation unit; and an output unit that outputs the output of the delay correlation operation unit to a decoding unit decoding the data based on the output of the delay correlation operation unit.

According to the delay detector circuit having this configuration, delay detection is performed by the limiter amplifier transforming the received wave of the two-phase modulation method into a rectangular wave signal and amplifies the rectangular wave signal, the delay correlation operation unit performing the delay correlation operation on the output of the limiter amplifier, and the acquisition unit detecting whether the receive wave is a communication signal transmitted by the transmitter apparatus based on the output of the delay correlation operation unit. The result of the delay correlation operation generated during the delay detection operation is output to the decoding unit via the output unit. Therefore compared with the case of using the AGC amplifier and the AD converter in the previous stage of the delay correlation operation unit, the circuit scale becomes smaller. Furthermore compared with the case of dividing the received wave into two and performing the delay detection using one of the received waves and decoding data using the other received wave, the delay detector circuit with this configuration, that uses a part of the delay detector circuit for decoding processing, has low cost and can reduce power consumption.

The output unit here may be a terminal that outputs the output of the delay correlation operation unit, for example, or may be wiring that connects the delay correlation operation unit and the decoding unit (e.g. including lead line, wiring pattern on a board, and wiring pattern on an integrated circuit).

According to another aspect, in the above-described delay detector circuit, the limiter amplifier extracts only a communication band that is being used for communication.

The delay detector circuit having this configuration can remove a signal having a frequency other than the communication band, as noise.

According to another aspect, in the above-described delay detector circuit, the acquisition unit comprises: a pattern candidate storage unit that stores, in advance, a plurality of candidates for a shape of one symbol as pattern candidates; a shape generation unit that generates a shape of one symbol based on the output of the delay correlation operation unit; a comparison unit that compares the shape of one symbol generated by the shape generation unit and each of the plurality of pattern candidates; and a conformance determination unit that determines that the received wave is a communication signal transmitted by the transmitter apparatus when the shape of one symbol generated by the shape generation unit and any of the plurality of pattern candidates match for a plurality of times as a result of the comparison by the comparison unit.

In the delay detector circuit having this configuration, a plurality of candidates of a shape of one symbol are provided in advance. Therefore it is easier to determine that the received wave is a communication signal transmitted by the transmitter apparatus, and the delay detector circuit having this configuration can acquire the received wave with certainty. On the other hand, this delay detector circuit regards that the received wave is a communication signal transmitted by the transmitter apparatus (synchronization acquisition) if a shape of one symbol generated by the shape generation unit and any one of the plurality of pattern candidates match a plurality of times. Therefore the delay detector circuit having this configuration can determine that the received wave is a communication signal transmitted by the transmitter apparatus, and can accurately perform delay detection.

According to another aspect, in the above-described delay detector circuit, the shape generation unit comprises: a square operation unit that squares the output of the delay correlation operation unit; a threshold comparison unit that binarizes the output of the square operation unit by comparing the output of the square operation unit and a predetermined threshold; and a register unit that stores the output of the threshold comparison unit for one symbol.

According to this configuration, the shape generation unit is appropriately implemented, and the delay detector circuit is appropriately implemented.

According to another aspect, in the above-described delay detector circuit, the shape of one symbol is represented by a plurality of bits, the pattern candidate is a predetermined bit pattern formed by specifying a value of each bit in advance, the plurality of pattern candidates are mutually different bit patterns, and in at least one of the plurality of pattern candidates, at least one of the bits has an arbitrary value.

According to the delay detector circuit having this configuration, in at least one of the plurality of pattern candidates, at least one of the bits has an arbitrary value. Therefore even if the shape of the symbol becomes different from the waveform transmitted by the transmitter apparatus during transmission, the received wave can be regarded as the communication signal transmitted by the transmitter apparatus, and the delay detector circuit having this configuration can acquire the received wave with more certainty.

According to another aspect, in the above-described delay detector circuit further comprises a tracking unit that adjusts a time interval corresponding to a time length of one symbol when a predetermined processing is performed with the time interval, so that decoding can be performed in a center time position of one symbol.

The delay detector circuit according to this configuration further has the tracking unit, therefore the shift between the clock interval of the transmitter apparatus and the clock interval of the receiver apparatus is corrected, and delay detection can be performed with more certainty.

According to another aspect, in the above-described delay detector circuit, the tracking unit comprises: a second register unit that stores a square result generated by squaring the output of the delay correlation operation unit for one symbol; and an interval adjustment unit that compares a value at a center time position, which is located approximately at the center of the square result for one symbol stored in the second register unit, a value at a preceding time position that precedes the center time position, and a value at a subsequent time position that is subsequent to the center time position, and adjusts the time interval according to the comparison result.

According to this configuration, the tracking unit is appropriately implemented and the delay detector circuit is appropriately implemented.

According to another aspect, the above-described delay detector circuit further comprises a decoding unit that decodes the data based on the output of the delay correlation operation unit.

The delay detector circuit having this configuration further comprises the decoding unit, hence data can be decoded based on the received wave.

According to another aspect, in the above-described delay detector circuit, the decoding unit comprises: a third register that stores the output of the delay correlation operation unit for one symbol; and a data decoding unit that decodes data based on the value at a center position that is located approximately at the center of the third register.

According to this configuration, the decoding unit is appropriately implemented and the delay detector circuit is appropriately implemented.

According to another aspect, in the above-described delay detector circuit, the decoding unit comprises: a third register that stores the output of the delay correlation operation unit for one symbol; and a second data decoding unit that decodes data based on a value at a center position that is located approximately at the center of the third register, a value at a preceding time position that precedes the center position, and a value at a subsequent time position that is subsequent to the center position.

According to this configuration, decoding is performed considering not only the value at the center position located approximately at the center of the third register, but also a value at the preceding position of the center position and the value at the subsequent position of the center position, such as each value of a predetermined number of bits (one or a plurality of bits) located immediately before and immediately after the center position, hence a delay detector circuit having this configuration can decode data more accurately.

According to another aspect, in the above-described delay detector circuit, the communication signal is formed in a frame configuration constituted by a preamble portion and a payload portion, and when the acquisition unit determines that a received wave is a communication signal transmitted by the transmitter apparatus based on the output of the delay correlation operation unit, the acquisition unit further detects the fulfillment of the preamble portion based on the output of the decoding unit.

The delay detector circuit having this configuration can establish synchronization with the transmission signal by detecting the end of the preamble portion based on the output of the decoding unit.

A receiver apparatus according to another aspect comprises: a coupling unit that extracts a received wave based on a communication signal from a transmission line; a receive unit that decodes the communication signal data, based on the received wave extracted by the coupling unit; and a power receiving unit that generates drive power driving the receive unit in use of power flowing over the transmission line, wherein the receive unit comprises any one of the above mentioned delay detector circuits.

The receiver apparatus having this configuration, that has any one of the above mentioned delay detector circuits, has low cost and can reduce power consumption.

This application is based on Japanese Patent Application No. 2010-022671 filed on Feb. 4, 2010, and content thereof is included in the present application.

Although the present invention has been described appropriately and sufficiently through the embodiments, with reference to the drawings, those skilled in the art can easily change and/or modify the above mentioned embodiments. Therefore it should be interpreted that the changes or modifications made by those skilled in the art are included in the scope of the Claims, unless the scope of the Claims are departed from.

INDUSTRIAL APPLICABILITY

According to the present invention, a delay detector circuit and a receiver apparatus that uses the delay detector circuit can be provided.

The invention claimed is:

1. A delay detector circuit that performs a part of decoding processing for decoding data transmitted by a transmitter apparatus based on a received wave of a two-phase modulation method,
the delay detector circuit further comprising:
a limiter amplifier that transforms the received wave into a rectangular wave signal and amplifies the rectangular wave signal;
a delay correlation operation unit that performs a delay correlation operation on an output of the limiter amplifier;
an acquisition unit that determines whether the received wave is a communication signal transmitted by the transmitter apparatus based on an output of the delay correlation operation unit; and
an output unit that outputs the output of the delay correlation operation unit to a decoding unit that decodes data based on the output of the delay correlation operation unit,
wherein the acquisition unit further comprises:
a pattern candidate storage unit that stores, in advance, a plurality of candidates for a shape of one symbol as pattern candidates;
a shape generation unit that generates a shape of one symbol based on the output of the delay correlation operation unit;
a comparison unit that compares the shape of one symbol generated by the shape generation unit and each of the plurality of pattern candidates; and
a conformance determination unit that determines that the received wave is a communication signal transmitted by the transmitter apparatus when the shape of one symbol generated by the shape generation unit and any of the plurality of pattern candidates match for a plurality of times as a result of the comparison by the comparison unit.

2. The delay detector circuit according to claim 1, wherein the limiter amplifier extracts only a communication band which is being used for communication.

3. The delay detector circuit according to claim 2, wherein the shape generation unit further comprises:
a square operation unit that squares the output of the delay correlation operation unit;
a threshold comparison unit that binarizes an output of the square operation unit by comparing the output of the square operation unit and a predetermined threshold; and
a register unit that stores an output of the threshold comparison unit for one symbol.

4. The delay detector circuit according to claim 2, wherein the shape of one symbol is represented by a plurality of bits,
the pattern candidate is a predetermined bit pattern formed by specifying a value of each bit in advance, the plurality of pattern candidates are mutually different bit patterns, and in at least one of the plurality of pattern candidates, at least one of the bits has an arbitrary value.

5. The delay detector circuit according to claim 1, further comprising:

a tracking unit that adjusts a time interval corresponding to a time length of one symbol when a predetermined processing is performed with the time interval, so that decoding can be performed at a center time position of one symbol.

6. The delay detector circuit according to claim 5, wherein the tracking unit further comprises:

a register unit that stores a square result generated by squaring the output of the delay correlation operation unit for one symbol; and an interval adjustment unit that compares a first value at the center time position, which is located approximately at a center of the square result for one symbol stored in the register unit, a second value at a preceding time position that precedes the center time position, and a third value at a subsequent time position that is subsequent to the center time position, and adjusts the time interval according to the compared value.

7. The delay detector circuit according to claim 1, further comprises:

a decoding unit that decodes the data based on the output of the delay correlation operation unit.

8. The delay detector circuit according to claim 7, wherein the decoding unit further comprises: a register that stores the output of the delay correlation operation unit for one symbol; and a data decoding unit that decodes data based on a value at a center position that is located approximately at the center of the register.

9. The delay detector circuit according to claim 7, wherein the decoding unit further comprises:

a register that stores the output of the delay correlation operation unit for one symbol; and a second data decoding unit that decodes data based on a first value at a center position that is located approximately at a center of the register, a second value at a preceding time position that precedes the center position, and a third value at a subsequent time position that is subsequent to the center position.

10. The delay detector circuit according to claim 7, wherein the communication signal is formed in a frame configuration constituted by a preamble portion and a payload portion, and when the acquisition unit determines that the received wave is a communication signal transmitted by the transmitter apparatus based on the output of the delay correlation operation unit, the acquisition unit further detects a fulfillment of the preamble portion based on an output of the decoding unit.

11. A receiver apparatus, comprising:

a coupling unit that extracts a received wave based on a communication signal from a transmission line;

a receive unit that decodes the communication signal data, based on the received wave extracted by the coupling unit; and a power receiving unit that generates drive power driving the receive unit in use of power flowing over the transmission line, wherein the receive unit further comprises a delay detector circuit that performs a part of decoding processing for decoding data transmitted by a transmitter apparatus based on the received wave of a two-phase modulation method, the delay detector circuit further comprising:

a limiter amplifier that transforms the received wave into a rectangular wave signal and amplifies the rectangular wave signal;

a delay correlation operation unit that performs a delay correlation operation on an output of the limiter amplifier;

an acquisition unit that determines whether the received wave is the communication signal transmitted by the transmitter apparatus based on an output of the delay correlation operation unit; and an output unit that outputs the output of the delay correlation operation unit to a decoding unit that decodes data based on the output of the delay correlation operation unit, wherein the acquisition unit further comprises:

a pattern candidate storage unit that stores, in advance, a plurality of candidates for a shape of one symbol as pattern candidates;

a shape generation unit that generates the shape of one symbol based on the output of the delay correlation operation unit;

a comparison unit that compares the shape of one symbol generated by the shape generation unit and each of the plurality of pattern candidates; and a conformance determination unit that determines that the received wave is the communication signal transmitted by the transmitter apparatus when the shape of one symbol generated by the shape generation unit and any of the plurality of pattern candidates match for a plurality of times as a result of the comparison by the comparison unit.

* * * * *